United States Patent [19]

Okumura et al.

[11] Patent Number: 4,845,587
[45] Date of Patent: Jul. 4, 1989

[54] THROUGH TYPE FILM CAPACITOR

[75] Inventors: Mitsunao Okumura; Atsuo Senda; Shunjiro Imagawa, all of Nagaokakyo, Japan

[73] Assignee: Murata Manufacturing Co., Ltd., Nagakakyo, Japan

[21] Appl. No.: 271,971

[22] Filed: Nov. 16, 1988

[30] Foreign Application Priority Data

Nov. 16, 1987 [JP] Japan ............................ 62-175163[U]

[51] Int. Cl.[4] ........................ H01G 4/42; H01G 4/08
[52] U.S. Cl. ..................................... 361/302; 361/323
[58] Field of Search ......................... 361/302, 321, 323

[56] References Cited

U.S. PATENT DOCUMENTS

| | | | |
|---|---|---|---|
| 2,101,153 | 12/1937 | Muth et al. | 361/321 X |
| 2,759,155 | 8/1956 | Hackenberg | 361/302 X |
| 2,919,390 | 12/1959 | Robinson et al. | 361/323 X |

FOREIGN PATENT DOCUMENTS 62-112313 5/1987 Japan .

Primary Examiner—Donald A. Griffin
Attorney, Agent, or Firm—Armstrong, Nikaido, Marmelstein, Kubovcik & Murray

[57] ABSTRACT

A through type film capacitor comprising a capacitor unit, a through terminal extending axially of the capacitor unit, and an earthing terminal plate connected to one electrode of the capacitor unit. The capacitor unit includes a dielectric film in bellows form having inner and outer surfaces thereof coated with electrodes and fixed in an axially compressed form.

7 Claims, 6 Drawing Sheets

THROUGH TYPE FILM CAPACITOR

BACKGROUND OF THE INVENTION

(1) Field of the Invention

The present invention relates to through type capacitors incorporated into various electric and electronic appliances.

(2) Description of the Prior Art

Conventionally, through type capacitors employ a dielectric element formed of a ceramic and having a cylindrical shape or a dielectric element formed of a plastic film rolled into a cylindrical shape.

FIGS. 1 (a) and (b) show sections of known through type capacitors comprising a ceramic and a plastic film acting as the dielectric element, respectively.

The through type capacitor 31 shown in FIG. 1 (b) is designed for low voltage use. This capacitor 31 includes a cylindrical ceramic 30, electrodes 32 and 33 formed on an inner and an outer surfaces of the ceramic 30, and a through conductor 34 connected to the inner electrode 32.

FIG. 1 (a) is a partly sectional view of a through type capacitor 21 designed for high voltage use and comprising plastic films acting as the dielectric element. This through type capacitor 21 includes a cylindrical capacitor unit 22, a through terminal 23, an earthing terminal plate 24, a collector plate 25, and a cylindrical insulator 28.

The capacitor unit 22 includes a first tape-shaped dielectric film 222 with electrode layers 221 formed on a main surface thereof, and a second tape-shaped dielectric film 224 having substantially the same width as the first dielectric film 222 and having electrode layers 223 formed on a main surface thereof. The first and second dielectric films 222 and 224 are wound into a cylindrical shape around the insulator 28 with the electrode layers 223 of the second dielectric film 224 superposed on another main surface of the first dielectric film 222.

The electrode layers 221 formed on the first dielectric film 222 extend from one side of the first dielectric film 222, leaving a fixed margin, to the other side thereof and onto one end face of the capacitor unit 22. The electrode layers 223 formed on the second dielectric film 224 extend from the side of the second dielectric film 224 corresponding to said other side of the first dielectric film 222, leaving a fixed margin, to the side thereof corresponding to said one side of the first dielectric film 222 and onto the other end face of the capacitor unit 22.

Metallicon electrodes 26 and 27 are formed by applying a molten metal to the two end faces of the capacitor unit 22. The metallicon electrode 26 is electrically connected to the electrode layers 221 of the first dielectric film 222 and the other metallicon electrode 27 to the electrode layers 223 of the second dielectric film 224.

The earthing terminal plate 24 and the collector plate 25 are soldered to the metallicon electrodes 26 and 27, respectively.

The through type capacitor 31 employing a ceramic as illustrated in FIG. 1 (b) undergoes great capacity variations due to temperature variations. Its capacity shows a sharp drop to $-30 \sim -80\%$ with a rated voltage application. In addition, it is difficult for this type of through type capacitor to have a large capacity and impossible to avoid high impedance particularly in low frequency ranges. If this through type capacitor is enlarged for high voltage use, its manufacturing cost becomes considerably high. There is also a problem that the weight of the ceramic makes it difficult to realize a light and small through type capacitor.

The through type capacitor 21 employing plastic films as the dielectric element as illustrated in FIG. 1 (a) involves winding of the two dielectric films, which poses the problem of very low productivity.

SUMMARY OF THE INVENTION

A primary object of the present invention, therefore, is to provide a through type capacitor which is small in size but has a large capacitance little variable with temperature.

Another object of the invention is to provide a through type capacitor well suited for mass production.

A further object of the invention is to provide a through type capacitor having low residual inductance and suited for use in high frequency circuits.

The above objects are fulfilled, according to the present invention, by a through type film capacitor comprising a capacitor unit including a dielectric film in bellows form fixed to an axially compressed state and electrode layers formed on inner and outer surfaces of the dielectric film, the electrode layers being separated from each other at end faces of the dielectric film, a through terminal extending through the capacitor unit and electrically connected to the inner electrode layer of the capacitor unit, and an earthing terminal plate having a planar shape and defining an opening for loosely receiving the through terminal, the earthing terminal plate being electrically connected to the outer electrode layer of the capacitor unit.

The inner electrode layer of the capacitor unit may be connected to the through terminal via a collector plate.

In a preferred embodiment of the invention, the earthing terminal plate is connected to the outer electrode layer at one end face axially of the capacitor unit, and the collector plate is connected to the inner electrode layer at the other end face axially of the capacitor unit.

The capacitor unit is formed of the dielectric film cut at one axial end thereof through a trough of the bellows and at the other axial end through a ridge of the bellows and fixed to the axially compressed state, with the outer electrode layer exposed at the one end face and the inner electrode layer exposed at the other end face.

In another embodiment of the invention, the collector plate is disposed concentrically and substantially on the same plane with the earthing terminal plate.

In this embodiment, the earthing terminal plate is connected to the outer electrode layer at one end face axially of the capacitor unit, and the collector plate is connected to the inner electrode layer also at the one end face.

The capacitor unit may be formed of the dielectric film cut at one axial end thereof through an intermediate position between a trough and a ridge of the bellows, with both the outer electrode layer and inner electrode layer exposed at the one axial end.

With the through type capacitor having the above construction, capacity variations due to temperature are reduced to a minimum since the dielectric component of the capacitor unit comprises a dielectric film. Furthermore, the dielectric film in bellows form has a large surface area for a small bulk, which allows the capacitor to be small but have a large capacitance.

In manufacturing the capacitor unit, an elongate dielectric film in bellows form may just be cut to pieces of an appropriate length after forming the electrodes on the inner and outer surfaces thereof. The through type capacitor according to the present invention is thus well suited for mass production.

As will be particularly described in relation to the embodiments hereinafter, the earthing terminal plate and the collector plate may be connected respectively to the outer and inner electrode layers exposed at one end face of the dielectric film, thereby causing electric current to flow in opposite directions through the outer and inner electrode layers at any position of the dielectric film. This feature produces the effect of the residual inductance of one electrode layer canceling that of the other electrode layer. The overall residual inductance thus minimized allows the capacitor of the present invention to be used in high frequency ranges.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Figure 1A:
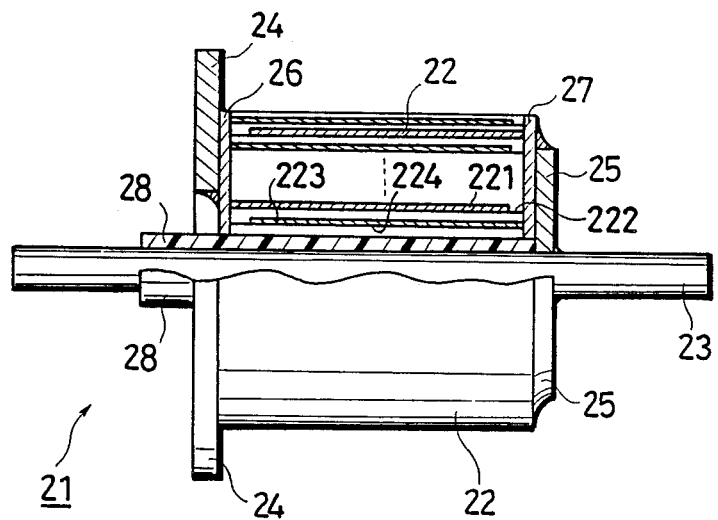
FIGS. 1 (a) and (b) are side views, partly broken away, of known through type capacitors, respectively, FIG. 2 (a) is a side view, partly broken away, of a through type film capacitor according to one embodiment of the present invention, FIG. 2 (b) is a view of the capacitor seen in the direction of an arrow P1 in FIG. 2 (a), FIG. 3 (a) is a side view, partly broken away, of a dielectric film, FIG. 3 (b) is a front view of the dielectric film, FIG. 4 (a) is a side view, partly broken away, of a dielectric film coated with electrode layers, FIG. 4 (b) is a front view of the dielectric film of FIG. 4 (a), FIG. 5 (a) is a side view, partly broken away, of a capacitor unit, FIG. 5 (b) is a front view of the capacitor unit, FIG. 6 (a) is a side view, partly broken away, of a through type film capacitor according to another embodiment of the invention, FIG. 6 (b) is a front view of the capacitor of FIG. 6 (a)
Figure 1B:
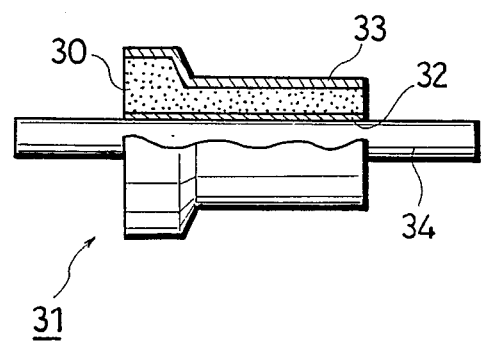
Figure 2A:
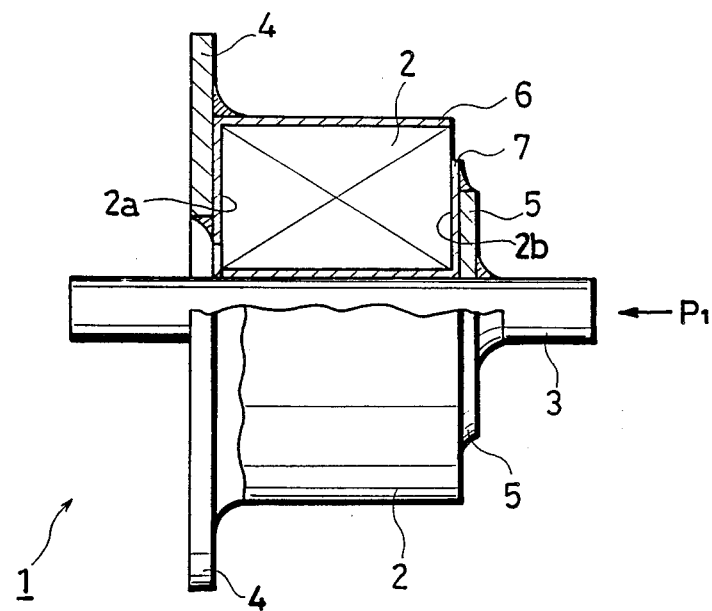
Figure 2B:
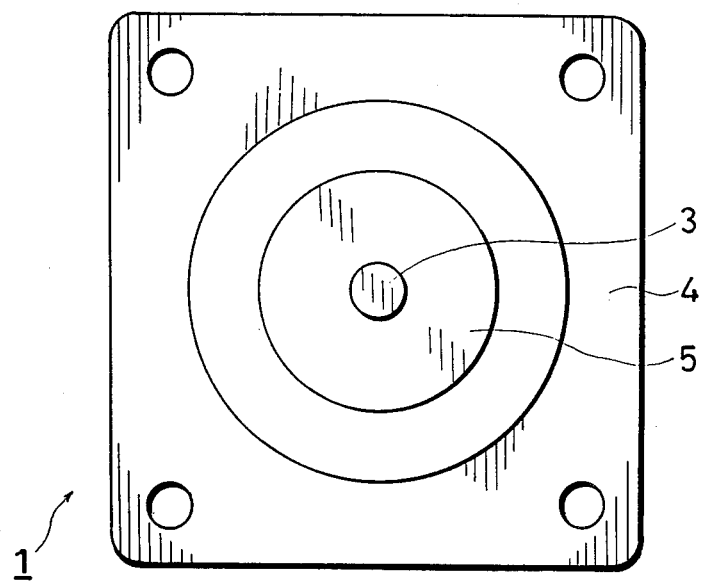

FIGS. 2 (a) and (b) show a through type capacitor according to one embodiment of the present invention. This capacitor 1 comprises a cylindrical capacitor unit 2, a through terminal 3, an earthing terminal plate 4 and a collector plate 5.

Figure 3A:
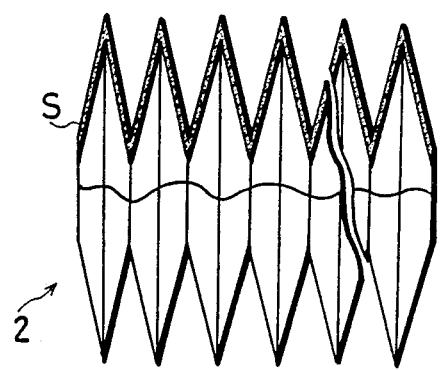
Figure 3B:
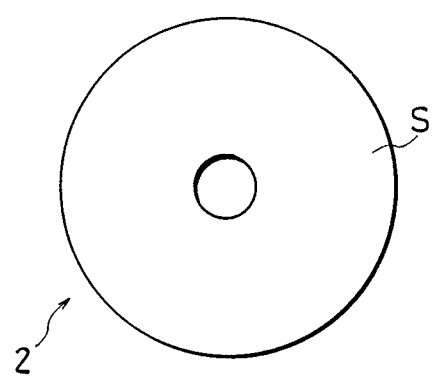
Figure 4A:
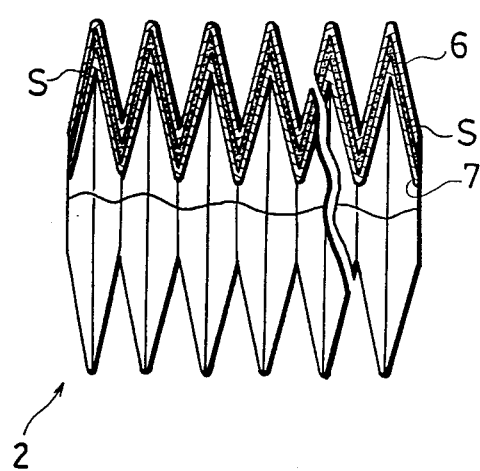
Figure 4B:
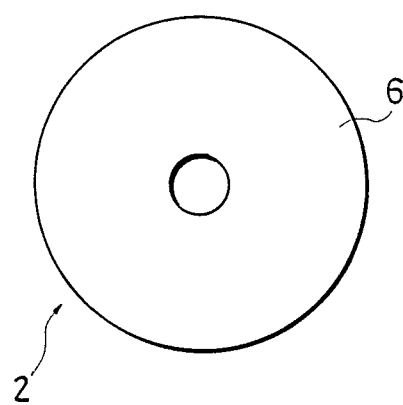
Figure 5A:
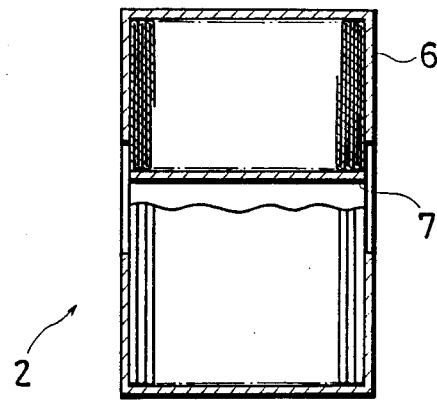
Figure 5B:
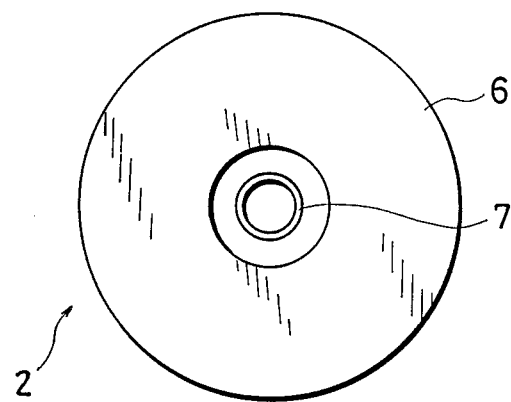

The capacitor unit 2 includes dielectric film S in bellows form as shown in FIG. 3, and having electrode layers 6 and 7 formed on outer and inner surfaces thereof as shown in FIG. 4. The capacitor unit 2 having this construction is fixed to an axially compressed state as shown in FIG. 5. The dielectric film S in bellows form may be manufactured, for example, by blow-molding a dielectric plastic. The dielectric film S may also be manufactured by vacuum forming. The electrode layers 6 and 7 may be formed on the outer and inner surfaces of the dielectric film S by electroless wet plating, vapor deposition or the like. When forming the electrode layers 6 and 7, resists may be formed on end faces of the dielectric film S in advance to prevent adhesion thereto of the electrode layers, or the electrode layers may be formed on the inner and outer surfaces of a elongate dielectric film which is then cut to a length corresponding to one capacitor unit.

In FIG. 4, both end faces of the dielectric film S are defined by cuts at recesses or troughs of the bellows. However, the end faces may be defined by cuts at projections or ridges, or at intermediate positions between ridges and troughs. Where the bellows is cut at the troughs as in FIG. 4, the axially compressed capacitor unit 2 has the inner electrode layer 7 exposed only slightly at a center position of each end face. On the other hand, where the bellows is cut at the ridges, the inner electrode layer 7 is exposed approximately over an entire area of each end face of the capacitor unit 2. Where the bellows is cut at intermediate positions between the troughs and ridges, both the inner and outer electrode layers 6 and 7 are exposed at each end face.

The capacitor unit 2 shown in FIG. 2 has one end face 2a defined by cutting the bellows at a trough and the other end face 2b defined by cutting the bellows at a ridge. Thus, the outer electrode layer 6 is exposed at one end face 2a and the inner electrode layer 7 at the other end face 2b. The outer electrode layer 6 exposed at one end face 2a is electrically connected to the earthing terminal plate 4 loosely penetrated by the through terminal 3. The inner electrode layer 7 exposed at the other end face 2b is electrically connected to the collector plate 5. The collector plate 5 is fixed on and electrically connected to the through terminal 3.

The dielectric film S is formed of an organic material such as polyethylene terephthalate, polypropylene or polycarbonate. The electrode layers are formed of a metallic material such as copper (Cu), aluminum (Al) or zinc (Zn).

Figure 6A:
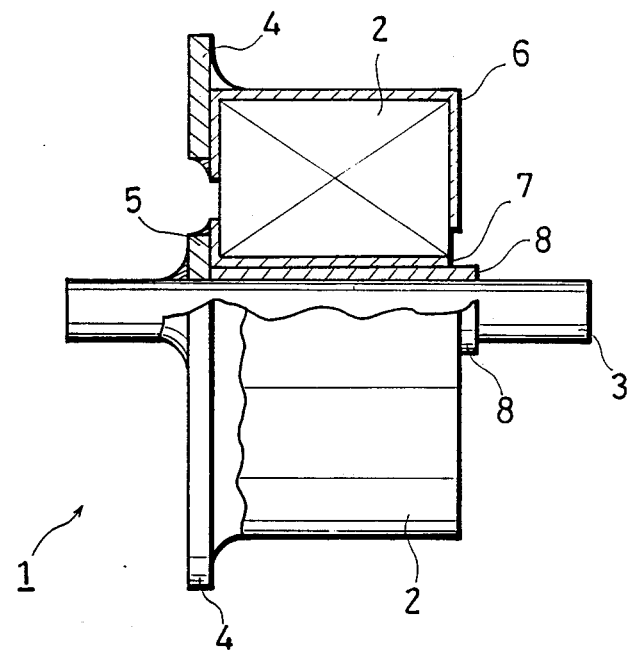
Figure 6B:
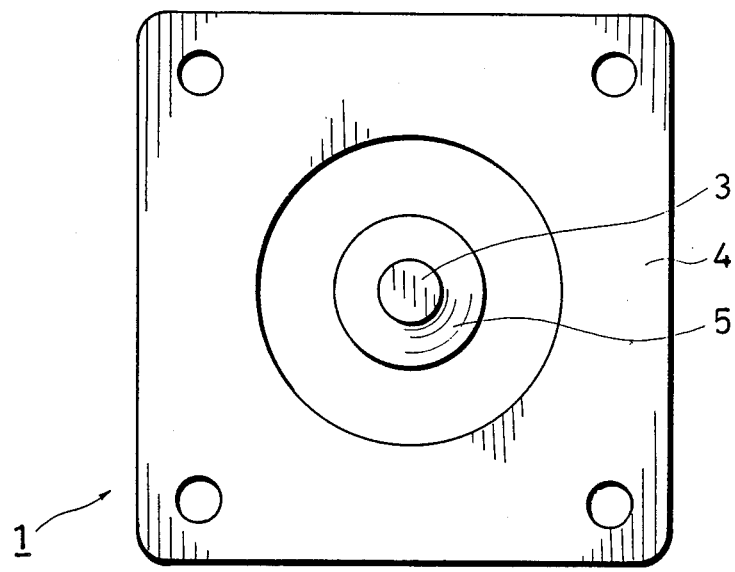

FIGS. 6 (a) and (b) show a through type capacitor according to another embodiment of the invention. In this embodiment, the dielectric film in bellows form is cut at an intermediate position between a trough and a ridge whereby both the outer electrode layer 6 and inner electrode layer 7 are exposed at one end face 2a of the capacitor unit 2. This capacitor has the collector plate 5 and earthing terminal plate 4 arranged concentrically on the same plane. The collector plate 5 is electrically connected to the inner electrode layer 7 exposed at the end face 2a, and the earthing terminal plate 4 to the outer electrode layer 6 also exposed at the end face 2a. The capacitor further includes a cylindrical insulator 8 interposed between the capacitor unit 2 and the through terminal 3 to maintain the inner electrode layer 7 exposed at inside peripheral walls of the capacitor unit 2 out of direct contact with the through terminal 3.

Where, as in this embodiment, the earthing terminal plate 4 is connected to the outer electrode layer 6 and the collector plate 5 to the inner electrode layer 7 on the same end face of the capacitor unit 2, the residual inductance is reduced under a certain condition whereby the capacitor may be used in high frequency ranges. The reason will be explained with reference to FIG. 7. The certain condition mentioned above is covering of the outer and inner electrode layers 6 and 7 with insulating films as referenced A and B in FIG. 7. This construction prevents direct contact between parts of the outer electrode layer 6 defining opposite sides of each trough 2c and between parts of the inner electrode layer 7 defining opposite sides of each ridge 2d when the dielectric film S is axially compressed. Assuming that a current flows from the collector plate 5 to the earthing terminal plate 4, there occur opposite flows of the current through the electrode layers 6 and 7, as indicated by arrows C and D, at each section of the dielectric film S. Consequently, the inductance of each electrode layer is counteracted by the current flowing through the other electrode layer, thereby minimizing the residual inductance of the capacitor.

Figure 7:
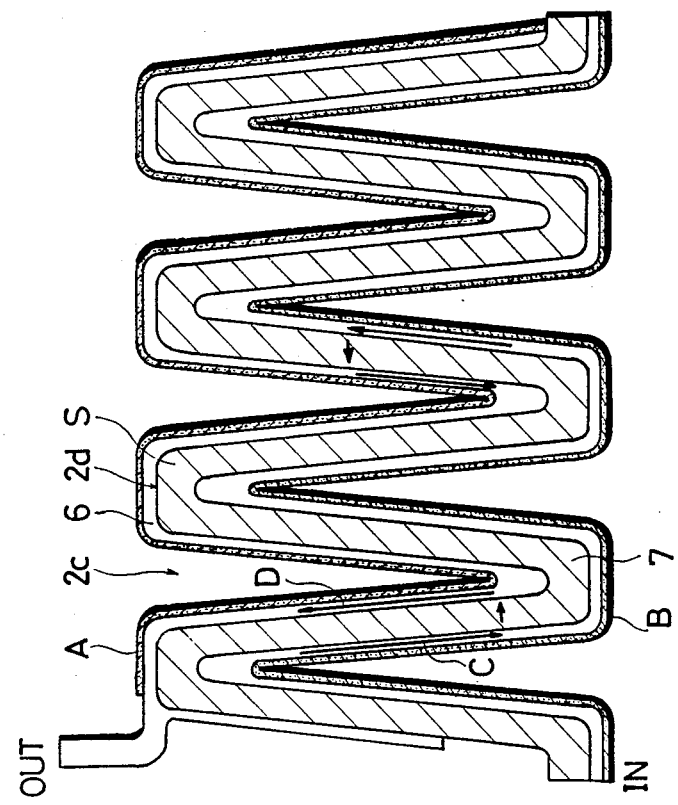
FIG. 7 is n explanatory view for illustrating the reason for a residual inductance reduction.

Although each electrode layer is covered by an insulating film in FIG. 7, insulators may be provided only in recesses of the inner and outer surfaces.

The present invention is not limited to the foregoing embodiments, but various modifications may be made within the scope of the invention. For example, although not illustrated in the drawings, each fold of the troughs and ridges may be rounded when molding the bellows film, for absorbing the stress of compression thereby to prevent cracks and peeling of the electrode layers. Further, while the bellows film is cylindrical in the illustrated examples, the film may be of square cross section for facility of chipping.

What is claimed is:

1. A through type film capacitor comprising;
    a capacitor unit including a dielectric film in bellows form fixed in an axially compressed state and electrode layers formed on inner and outer surfaces of the dielectric film, said electrode layers being separated from each other at end faces of said dielectric film,
    a through terminal extending through said capacitor unit and electrically connected to the inner electrode layer of said capacitor unit, and
    an earthing terminal plate having a planar shape and defining an opening for loosely receiving said through terminal, said earthing terminal plate being electrically connected to the outer electrode layer of said capacitor unit.

2. A through type film capacitor as claimed in claim 1, wherein the inner electrode layer of said capacitor unit is connected to said through terminal via a collector plate.

3. A through type film capacitor as claimed in claim 2, wherein said earthing terminal plate is connected to said outer electrode layer at one end face axially of said capacitor unit, and said collector plate is connected to said inner electrode layer at the other end face axially of said capacitor unit.

4. A through type film capacitor as claimed in claim 3, wherein said capacitor unit is formed of the dielectric film cut at one axial end thereof through a trough of the bellows and at the other axial end through a ridge of the bellows and fixed to the axially compressed state, with said outer electrode layer exposed at said one end face and said inner electrode layer exposed at said other end face.

5. A through type film capacitor as claimed in claim 2, wherein said collector plate is disposed concentrically and substantially on the same plane with said earthing terminal plate.

6. A through type film capacitor as claimed in claim 5, wherein said earthing terminal plate is connected to said outer electrode layer at one end face axially of said capacitor unit, and said collector plate is connected to said inner electrode layer also at said one end face.

7. A through type film capacitor as claimed in claim 6, wherein said capacitor unit is formed of the dielectric film cut at one axial end thereof through an intermediate position between a trough and a ridge of the bellows, with both said outer electrode layer and inner electrode layer exposed at said one axial end.

* * * * *